May 12, 1959     J. E. SIMPSON     2,886,331
COMBINATION STRAW CHOPPING AND SPREADING APPARATUS
Filed Oct. 28, 1953     2 Sheets-Sheet 1
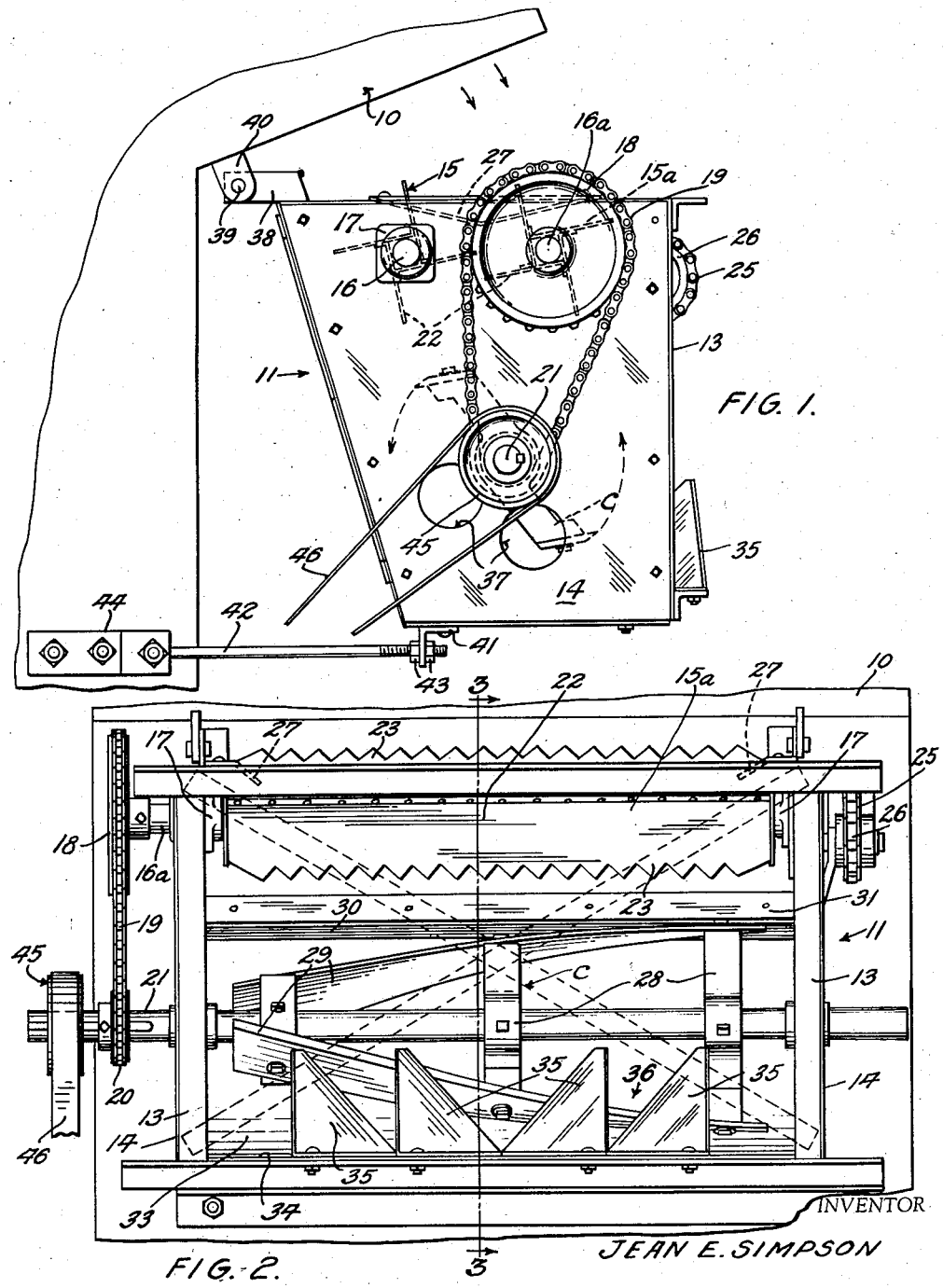
INVENTOR
JEAN E. SIMPSON
BY
ATTORNEY May 12, 1959 J. E. SIMPSON 2,886,331
COMBINATION STRAW CHOPPING AND SPREADING APPARATUS
Filed Oct. 28, 1953 2 Sheets-Sheet 2

INVENTOR
JEAN E. SIMPSON
BY
ATTORNEY

United States Patent Office 2,886,331
Patented May 12, 1959

2,886,331

COMBINATION STRAW CHOPPING AND SPREADING APPARATUS

Jean E. Simpson, Forest, Ohio

Application October 28, 1953, Serial No. 388,758

1 Claim. (Cl. 275—3)

This invention relates to an improved plant-chopping and distributing mechanism adapted for use in connection with combines and other forms of crop-harvesting, picking or gathering machines.

An object of the invention is to provide a simple, efficient and compact mechanism by which threshed vine or plant stalks or stems, gathered by the operation of a combine, harvester or other similar machine, are, prior to their discharge from the machine, severed into relatively short lengths and thereafter forcibly spread uniformly on the field over which the associated machine operates.

It is an additional object to provide a plant-chopping mechanism for receiving vine or plant stems or stalks as the latter are discharged from the elevator of a combine, whereby to cut such stalks into shorter lengths, for deposit on the ground in the form of a mulch for soil improvement, the short stalk or stem lengths being capable of being readily plowed or otherwise turned into the soil, thereby avoiding the usual practice of gathering and burning uncut straw discharged from a combine, or in preventing such uncut straw, when deposited on young clover, for instance, from smothering or interfering with the growth and development of the latter.

When uncut straw is thus deposited, fungus growth is encouraged, or the straw must be removed, in a weather-damaged state, with expensive labor and with loss of soil improvement which is made possible with the proper use of the straw. When straw, obtained from the cut plants or vines of small grain, field corn, soya beans or the like, is left on the ground in an undiminished condition, the soil is often found to be wet and unduly soggy under the thick straw bunches, rendering plowing or disking of the field difficult or impossible. Sometimes, under such conditions, it is necessary to rake and burn the long straw lengths so the land can be farmed.

When harvested straw is chopped into uniform relatively small lengths and evenly distributed on the field, decay thereof takes place rapidly, the operation serving to increase the fertility of the soil, as well as avoiding the steps of gathering or burning such straw.

Therefore, a further object of the invention is to provide an improved stalk, stem or straw-chopping attachment formed for ready application to the discharging end of a harvesting combine, or the like, and by which the normally long lengths of plant growth discharged by the combine or other harvester are initially engaged by power-driven rotary notched-edge feed rotors and rapidly advanced into engagement with a high-speed rotary chopper, the latter serving to reduce the plants into a state wherein the same are composed of relatively short lengths which are thereafter forcibly discharged from the attachment and broadcast over a field to be readily assimilated by the field soil.

Still another object of the invention is to provide a straw-chopping attachment for combines or the like which comprises a relatively compact frame adapted to be attached, preferably, to the rearward end of a combine adjacent the discharge end of an associated elevating apparatus to receive plant growth gathered by such combine, there being mounted in the frame a pair of spaced parallel, intermeshing feed rotors arranged to positively and uniformly advance the plant growth into engagement with a high speed rotary chopping reel which serves to chop and reduce the relatively large stalks and stems to a finely divided state, and which further, due to its relatively high speed of rotation, serves to create a forced draft through the discharge of the attachment to thereby forcibly scatter and broadcast the finely divided straw over an associated field, there being provided in the discharge end of the attachment a series of baffles or deflector plates which function to diffuse the air being forced through the discharge end of the attachment by the rotary chopping reel in a manner to cause the relatively finely divided straw to be scattered and distributed therefrom over a relatively wide area at the rear of the associated combine.

Another object of the invention is to provide in a straw-chopping attachment of this character a pair of adjacent parallel feed rotors which are so constructed that their journals are kept clear at all times of plant stalks or stems fed into the attachment, whereby to maintain such rotors in a freely rotating state in their respective journals and to prevent the wrapping of plant stalks or stems around such journals.

For a further and more complete understanding of the invention and the various additional objects and advantages realized therefrom, reference is made to the following description and the accompanying drawings, wherein:

Fig. 1 is a fragmentary side elevational view disclosing the rear or straw-discharging end of a crop-harvesting combine equipped with the straw-chopping attachment forming the present invention;

Fig. 2 is a rear end elevational view of the attchment looking toward the discharge outlet thereof;

Figure 3:
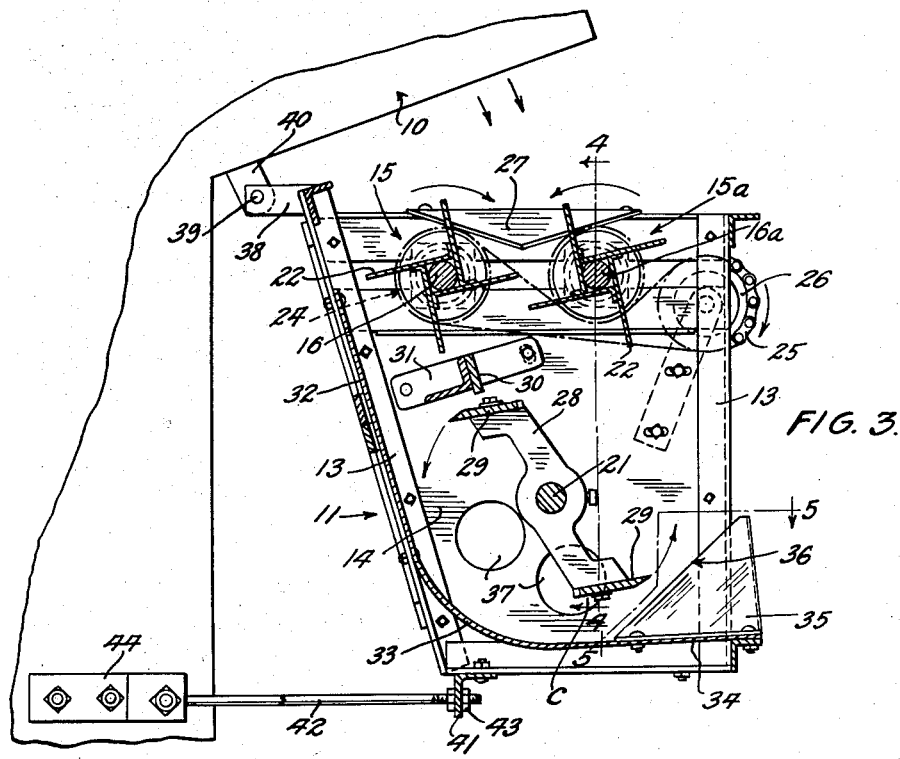
Fig. 3 is a vertical transverse sectional view taken through the chopper attachment on the plane indicated by the line 3—3 of Fig. 2.

Referring to the drawings, the numeral 10 designates the discharge end of a conventional agricultural machine known as a combine. In such a machine, the grain or beans contained by the growing plants harvested by the machine are removed from the plants. Straw stalks or vines, referred to mainly as straw, are elevated and carried to the rear of the machine and are discharged therefrom in a downward direction, as indicated in Fig. 1. In accordance with the present invention, an attachment is provided for receiving the straw and cutting the same into smaller lengths, by what is referred to as a chopping action, and scattering the same, so that the resulting short lengths of straw may be evenly broadcast directly upon the ground or soil traversed by the machine for soil-benefiting purposes.

In accordance with the present invention, the plant-chopping attachment, indicated generally at 11, comprises a rigid box-like frame 13 composed of angle iron members and a pair of spaced vertically disposed end walls 14. The top of the frame is open in order to receive the straw discharged from the downwardly facing outlet of the combine. In this instance, the upper end portion of the frame includes a pair of spaced parallel feed rotors 15 and 15a which extend transversely across the upper portion of the frame. As shown, the feed rotors include shafts 16 and 16a which are journaled in fixed bearings 17 carried by the end walls 14. One of the shafts, indicated at 16a, has fastened thereto at one end a drive sprocket 18 around which passes an endless drive chain 19 which leads to a smaller sprocket 20 mounted on the shaft 21 of a chopper reel C.

Each of the feed rotors includes a plurality of relatively angularly disposed, longitudinally extending metallic blades 22 having toothed longitudinal edges shown at 23. In this instance, each of the feed rotors comprises four of the blades shown at 22, each blade extending tangentially from its shaft. The blades of the adjacent rotors are arranged in relative axial offset relation, as disclosed particularly in Fig. 3, so that upon opposite rotation, straw is gathered between intermeshing sets of the blades and positively advanced through the rotor section of the attachment. Also, due to the offsetting of the blades of the respective rotors, the blades of each rotor tend to comb across and clear the opposite blades of accumulated straw as the respective blades move away from each other, thus positively disengaging the straw from the blades after the same has passed through the rotors.

In order that the feed rotors may revolve in opposite directions, as indicated by the arrows in Fig. 3, the shafts 16 and 16a, at the ends thereof opposite to the sprocket 18, are provided with motion transmitting sprockets 24. An endless chain 25 is trained around the lower part of the sprocket 24 carried by the shaft 16a, and thence around the upper part of the sprocket 24 carried by the shaft 16. From the sprocket 24 on the shaft 16, the lower run of the chain 25 passes around an idler sprocket indicated at 26, in order that the chain may extend downwardly for passage around the lower portion of the sprocket 24 on the shaft 16a. Since the shaft 16a is driven from the cutter shaft 21 through the chain and sprocket construction disclosed at 18 and 19, motion in the desired opposite directions is thus imparted to the feed rotors. The straw is thus engaged by the feed rotors as it is discharged from the outlet 10 of the associated combine and is positively advanced by the feed rotors toward the chopper mechanism C, in which the straw is reduced in length, as desired.

Figure 4:
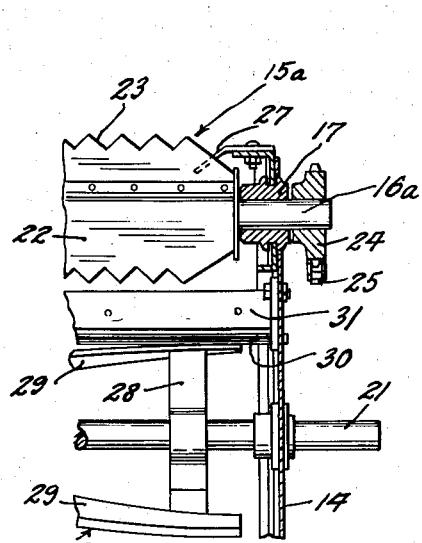
Fig. 4 is a detail vertical sectional view on the line 4—4 of Fig. 3.

To prevent the straw from twisting and tangling around the shafts 16 and 16a at their journal points, and thus impeding the operation of the attachment or rendering the same inoperative, there is provided, as shown in Figs. 3 and 4 a plurality of inwardly disposed stationary guards 27. These guards are formed with V-shaped angularly inclined extensions which project downwardly and inwardly toward an imaginary center line drawn between the opposed blades of the feed rotors 15 and 15a. The guards 27 thus provide deflector plates at the sides of the frame to divert straw inwardly toward the central portions of the rotors.

The chopper mechanism C comprises the drive shaft 21 which carries at spaced intervals therealong a plurality of radially projecting support arms 28 which, in turn, carry at their outer ends a pair of helical cutting blades 29, the latter cooperating with a stationary chopping block or bar 30 carried by a stationary supporting member 31. The bar 30 is disposed in relatively closely spaced plant cutting relation to the arc of movement of the beveled outer edges of the blades 29, so that as the blades 29 rotate in a counterclockwise direction, as viewed in Fig. 3, the straw passed by the feed rotors 15 and 15a will be chopped into relatively short lengths.

Figure 5:
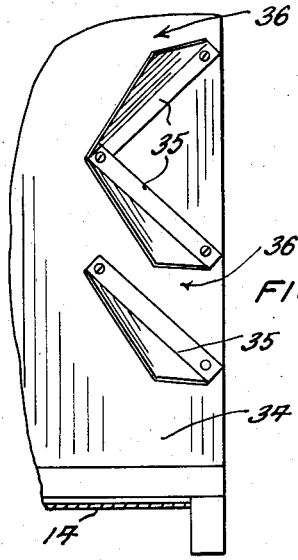
Fig. 5 is a detail horizontal sectional view on the line 5—5 of Fig. 3.

As will be seen in Fig. 3, the frame 13 is partially enclosed at the front end thereof by a wall 32 which merges at its lower end into a curved bottom 33. The curved bottom 33 terminates in a relatively flat bottom wall 34 which projects rearwardly beyond the back of the frame 13, as shown in Fig. 3. The upper surface of the wall 34 carries a plurality of relatively spaced stationary triangular distributor plates 35 which are arranged in relatively angular order, as indicated in Fig. 5, providing a multiplicity of angularly related air-discharging passages 36. It will be understood that the reel of the chopper mechanism is driven at relatively high speeds and functions in the manner of an axial flow blower to forcibly draw air in through a pair of orifices 37, formed in the end walls 14 of the frame, and discharge such air tangentially adjacent the bottom wall 34 and thence outwardly through the passages 36. This forced air circulation through the passages 36 tends to lift and forcibly scatter and cascade chopped straw outwardly from the rearward open end of the attachment and over a relatively wide area, so as to prevent the dropping of the chopped straw in batches or clumps upon the ground. Thus, by establishing a forced draft of air through the chopper mechanism and the discharge end of the attachment, the chopped straw may be evenly and widely distributed over the ground without requiring the use of a separate rotary distributor mechanism.

The frame 13 may be conveniently supported upon the associated combine or harvester by ears 38 projecting forwardly from the upper portion of the frame, which ears are pivoted as at 39 to complemental ears 40 carried by the discharge end 10 of the combine. At the lower end of the frame there is provided an angle member 41 formed with openings for the reception of the threaded outer ends of eye bolts 42, the threaded ends of said bolts carrying clamping nuts 43 which engage with opposite sides of the angle member 41. The inner or forward ends of the bolts 42 are pivotally fastened to brackets 44 stationarily mounted on the combine. As shown in Fig. 2, the cutter mechanism shaft 21, beyond the sprocket 20, is equipped with a pulley wheel 45, around which an endless belt 46 may pass for imparting power to the rotatable elements of the attachment, the power being obtained from a rotary engine-driven part, not shown, of the associated combine.

Thus it will be seen that the present invention provides not only an improved positively acting chopping mechanism, but functions also as an efficient distributor for the chopped material, utilizing a rotary chopping mechanism which, in combination with the structural components of the attachment, serves both to chop the straw or other plant growth discharged from the associated combine or harvester, and to spread and distribute the chopped material uniformly over a wide area of the ground traversed by the machine. The driven feed rotors employed in the present attachment insure an even and uniform passage of straw from the combine to the chopper mechanism, and thereby prevent over-charging of the chopper mechanism and consequent stoppage or batching within the discharge of the attachment.

In view of the foregoing, it will be understood that the present invention is applicable to a wide variety of agricultural machines employed in the harvesting of many different kinds of plants or crops. Therefore, I desire it to be understood that my invention may be employed in any plant or crop harvesting operation in chopping or reducing the size or length of plants to which it is now or may hereafter be found applicable.

I claim:

A combined straw-chopping and distributing attachment for farm combines and the like comprising a substantially rectangular box-like frame having an open material-receiving end at the top thereof and an open material-discharging side disposed in substantially right angular relation to said material-receiving end adjacent the bottom thereof; means for attaching said frame to a farm implement in a position to receive materials from the latter; a pair of spaced, parallel rotors extending transversely of and journalled in said frame adjacent the top end thereof, each of said rotors including a plurality of substantially coextensive, tangentially outwardly projecting arms, the arms of one rotor being arranged in closely adjacent but radially offset relation to the arms of the other of said rotors providing, upon rotation of said rotors in opposite directions, pockets to receive and advance substantially uniform amounts of material introduced into the material-receiving end of said frame; power transmission means carried by said frame for imparting opposite rotation to said rotors and in directions to advance materials pocketed between the arms of said rotors inwardly of said frame; cutting means including an elongated shaft transversely journaled in said frame for rotation therein, a plurality of radially extending arms secured to said shaft, and at least two helical cutting blades secured to the free ends of said arms, said cutting means positioned adjacent the bottom end of said frame and below said parallel rotors in spaced, substantially parallel relationship thereto, a substantially fixed chopping bar transversely secured to said frame below the parallel rotors and forwardly of a vertical plane passing between said rotors, and immediately above and in cooperating relationship with the helical blades of said cutting means, said frame at at least one end of said cutting means being provided with an air inlet disposed substantially axially of said cutting means; and power-transmitting means drivingly connected with said cutting means for rotating same at relatively high speed and in a direction toward said chopping bar, said cutting means serving, upon rotation, to simultaneously chop materials advanced through said frame by said rotors and to forcibly circulate air inwardly of said frame through said air inlet and outwardly through the open material-discharging side of said frame to forcibly distribute material chopped thereby outwardly from the open material-discharging side of said frame.

References Cited in the file of this patent

UNITED STATES PATENTS

| | | |
|---|---|---|
| 1,683,042 | Krogan | Sept. 4, 1928 |
| 1,713,094 | Saiberlich et al. | May 14, 1929 |
| 2,327,893 | Hobson | Aug. 24, 1943 |
| 2,611,407 | Alloway | Sept. 23, 1952 |
| 2,626,159 | Thompson | Jan. 30, 1953 |
| 2,656,868 | Hintz et al. | Oct. 27, 1953 |
| 2,670,775 | Elofson | Mar. 2, 1954 |